United States Patent Office 2,963,491
Patented Dec. 6, 1960

2,963,491

OESTRA - 1,3,5(10)-TRIENE-17β-OL-3-YL-α-OXYISO-BUTYRIC ACID AND PROCESS FOR THE PRODUCTION THEREOF

Paolo Galimberti, Pavia, and Vittorina Gerosa and Max Marcello Melandri, Milan, Italy, assignors to Societa Italiana Prodotti Schering, Milan, Italy No Drawing. Filed Jan. 15, 1960, Ser. No. 2,606

Claims priority, application Great Britain Mar. 24, 1959

5 Claims. (Cl. 260—397.1)

This invention is concerned with oestrogenic substances. The invention consists in a new oestrogenic compound, oestra-1.3.5(10)-triene-17β-ol-3-yl-α-oxyisobutyric acid of the structural formula

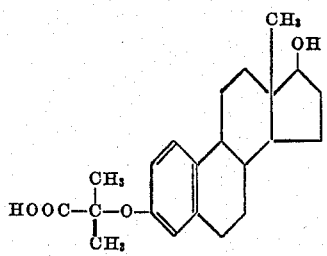

The new compound causes oestrus in ovariectomized female rats at doses as low as 13.5 γ/kg., as compared with 9 γ/kg. for oestradiol benzoate. However, the new compound shows a far lower order of toxicity than the oestradiol benzoate and its alkali metal salts are fairly soluble in water.

The invention also consists in a process for the production of the new compound referred to above, in which 17β-oestradiol is refluxed with 1–2 moles chloroform in acetone in the presence of an alkali hydroxide, and preferably sodium hydroxide for 6–10 hours, the solvent is removed by distillation, the residue is treated with water, a strong mineral acid is added to a pH of about 4.0, the precipitate formed is treated for at least 2 hours with a saturated aqueous alkali carbonate or bicarbonate solution, a strong mineral acid is added to a pH below 4.5 and the precipitate collected.

The invention is illustrated by the following example.

Example

A mixture of 4.35 g. of sodium hydroxide and 3.10 g. of chloroform is added to a solution of 5 g. of 17β-oestradiol in 150 ml. of anhydrous acetone. The mixture is refluxed with stirring for 6 hours, after which the solvent is removed by distillation and the residue is dissolved in water. A small amount of side products is removed by extraction with ethyl ether and the water solution is then filtered and acidified by the addition of hydrochloric acid to a pH of about 4.0.

The precipitate formed is collected, washed with cold distilled water and dissolved in a saturated aqueous sodium bicarbonate solution. The resulting alkaline solution is extracted with ether and the water layer is acidified by the addition of dilute hydrochloric acid. The precipitate is collected and recrystallized from ethyl acetate. The product is a white crystalline powder, M.P. 202–203° C. $[\alpha]_{25}^{D}$+64° (c., 1; dioxane). In methanol solution the substance shows the following adsorption maxima in the U.V. region of the spectrum:

218 mμ ($E_{1cm}^{1\%}$ 240); 278 mμ ($E_{1cm}^{1\%}$ 38)

We claim:
1. A new oestrogenic substance of the formula

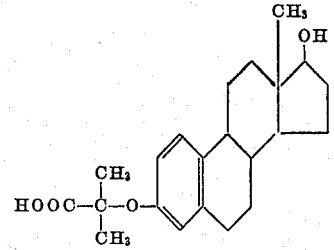

2. A process for the preparation of oestra-1.3.5(10)-triene-17β-ol-3-yl-α-oxyisobutyric acid of the formula

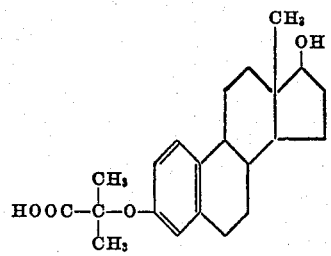

which comprises refluxing 17β-oestradiol with 1–2 moles of chloroform in the presence of an alkali metal hydroxide in an hydrous acetone for 6 to 10 hours, removing the solvent by distillation, dissolving the residue in water, acidifying the water solution to a pH of about 4.0, dissolving the precipitate formed in an alkali metal bicarbonate solution, acidifying the resulting alkaline solution to a pH below about 4.5 and collecting the precipitate.

3. A process for the preparation of oestra-1.3.5(10)-triene-17β-ol-3-yl-α-oxyisobutyric acid, which comprises dissolving oestradiol-17β in a mixture of acetone and chloroform in the presence of sodium hydroxide, refluxing the solution thus obtained for 6 to 10 hours, removing the solvent by distillation, dissolving the residue in water, acidifying the aqueous solution to a pH of about 4.0, dissolving the precipitate formed in a saturated aqueous sodium bicarbonate solution, acidifying the resulting alkaline solution to a pH below 4.5 and collecting the precipitate.

4. A process as claimed in claim 3, in which prior to each acidification step, the aqueous solution is extracted with ether.

5. A process for the production of the substance claimed in claim 1, which comprises dissolving oestradiol in a mixture of anhydrous acetone and chloroform in the presence of sodium hydroxide, refluxing the solution thus obtained for 6 to 10 hours, removing the solvent by distillation, dissolving the residue in water, extracting the resulting solution with ethyl ether, filtering the water layer, adding hydrochloric acid to the water layer to a pH of about 4, collecting the precipitate, dissolving the precipitate in a saturated water solution of sodium bicarbonate, acidifying the solution with hydrochloric acid and collecting the precipitate.

References Cited in the file of this patent
UNITED STATES PATENTS 2,906,758   Kincl et al. _____ Sept. 29, 1959